United States Patent [19]
Burton et al.

[11] 3,708,725
[45] Jan. 2, 1973

[54] CONTROL CENTER WITH SHELF SUPPORTED REMOVABLE CABINETS

[75] Inventors: Lawrence A. Burton, Oconomowoc; George W. Hennings, Milwaukee, both of Wis.

[73] Assignee: Allen-Bradley Company, Milwaukee, Wis.

[22] Filed: Jan. 6, 1971

[21] Appl. No.: 104,376

[52] U.S. Cl.............317/120, 200/50 AA, 312/214
[51] Int. Cl...............................................H02b 1/06
[58] Field of Search............................312/214, 223; 317/117–120; 200/50 AA

[56] References Cited

UNITED STATES PATENTS

| | | | |
|---|---|---|---|
| 3,482,143 | 12/1969 | Stark | 317/120 |
| 3,142,003 | 7/1964 | Olashaw | 317/120 |
| 3,495,135 | 2/1970 | Paape | 317/119 |
| 3,299,324 | 1/1967 | Yarbrough | 317/120 |

*Primary Examiner*—Robert K. Schaefer
*Assistant Examiner*—Gerald P. Tolin
*Attorney*—Arthur H. Seidel and Allan W. Leiser

[57] ABSTRACT

An electrical control center is shown made up of a set of three vertical byas that each house a number of individual electrical control assembly cabinets that are tiered one above the other. There is a separate door for each assembly cabinet, and each bay also has a wiring trough along its front for feeding wires to the assemblies which is enclosed by a separate wiring trough door. A wall-like insulating partition in each bay extends vertically and sidewardly across the interior of the bay in a plane spaced behind, but paralleling the front of the control center, and each such partition supports main power distributing buses on its rear face and a set of three vertically disposed feeder buses at its front face. To the front of each insulating partition there are a number of shelves which may be arranged at desired levels, and each shelf supports a control assembly cabinet which includes lower and upper latches for fixing the cabinet in position. Each cabinet has a recess along its lower right side for the full depth of the cabinet which is adjacent to the vertical wiring trough of the associated bay, so that as the cabinet is slid into and out of its position the recess may slide past wires and terminals extending out from the wiring trough.

6 Claims, 11 Drawing Figures

United States Patent
Burton et al.
[11] 3,708,725
[45] Jan. 2, 1973
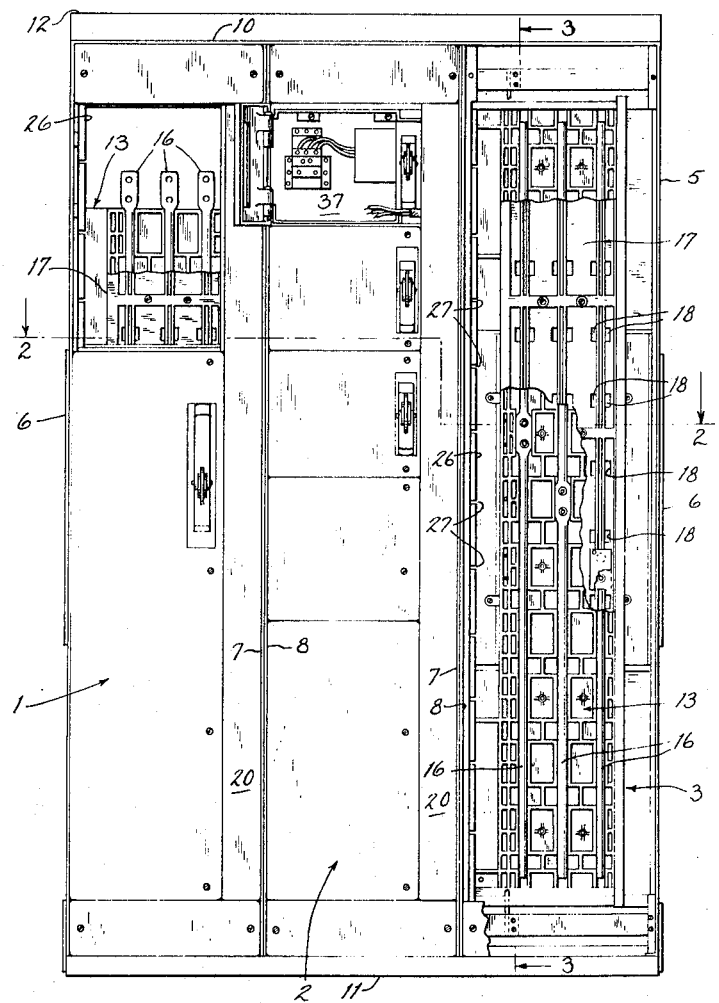

INVENTORS
LAWRENCE A. BURTON
GEORGE W. HENNINGS

BY Arthur L. Seidel

ATTORNEY

INVENTORS
LAWRENCE A. BURTON
GEORGE W. HENNINGS

BY Arthur H. Seidel

ATTORNEY

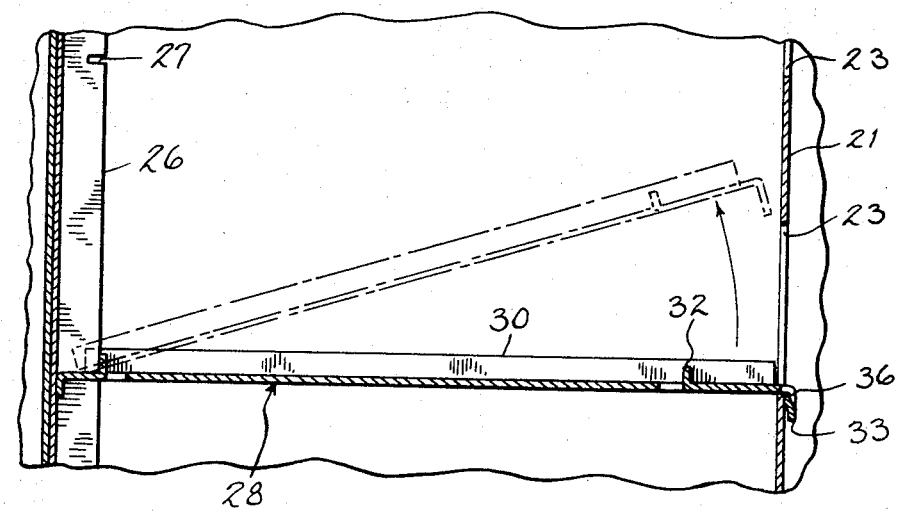
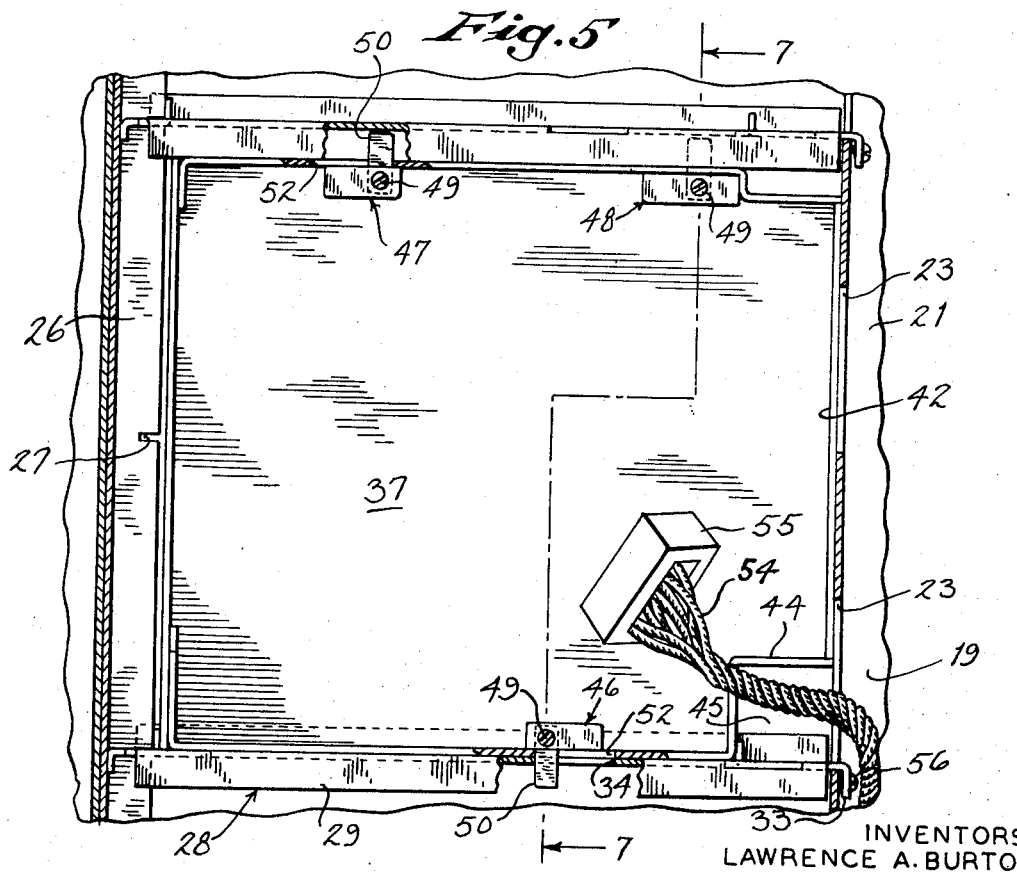

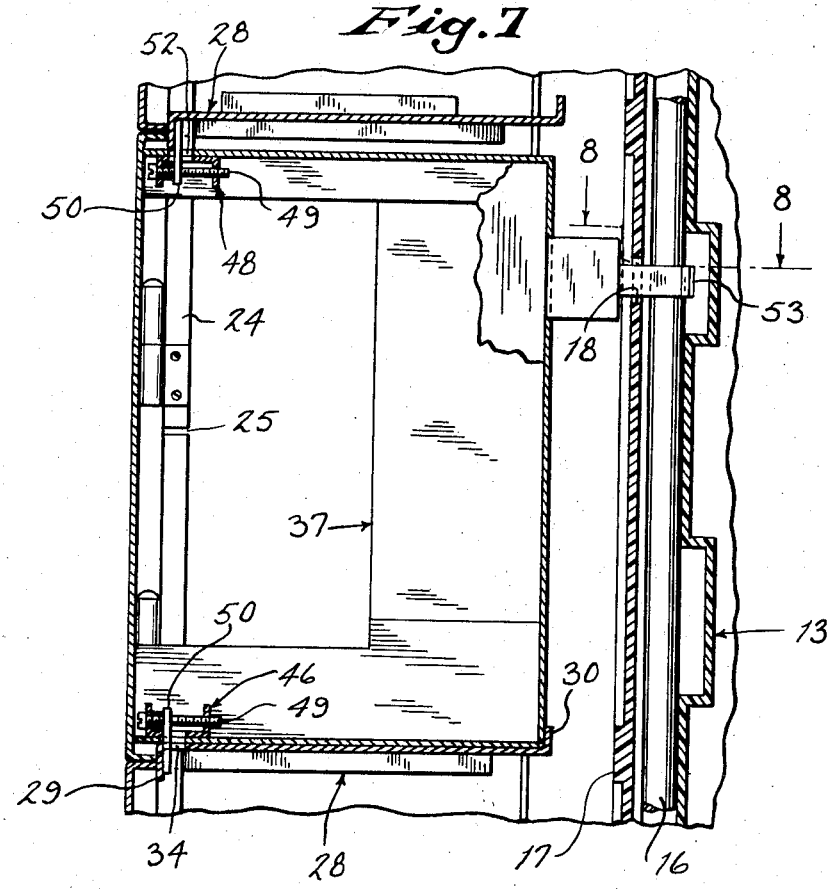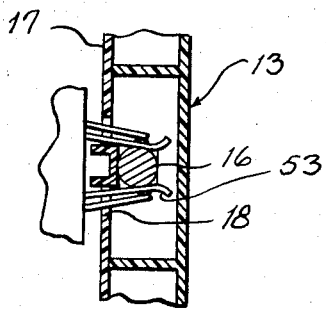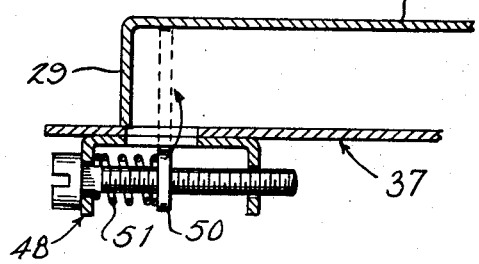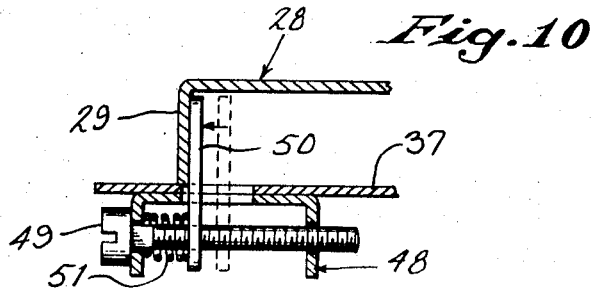

CONTROL CENTER WITH SHELF SUPPORTED REMOVABLE CABINETS

BACKGROUND OF THE INVENTION

Electrical control centers of the type of the present invention are usually employed as enclosures for housing a number of individual motor control assemblies that are each assembled in its own cabinet. Such enclosures are constructed of vertical bays attached to one another to obtain a unitary whole, and by varying the number of bays the size of a control center can be tailored to meet the requirements of a particular installation. Within each bay a number of control assembly cabinets are stacked one above the other in tiered relationship. The size and complexity of the control assemblies varies, and consequently the amount of space taken by each cabinet is also a variable. Provision is therefore made for accommodating cabinets of different sizes, and in different combinations and arrangements. It is a characteristic of control centers that the vertical bays and the cabinets mounted therein are standardized in their construction in order to achieve the desired convenience of an enclosure capable of housing electrical control assemblies for any of a variety of manufacturing or processing installations. While the term "control center" is usually associated with motor control equipment, other types of control apparatus can also be housed within a control center of the type of the present invention, such as control apparatus governing welders, ovens or other electrical apparatus.

The feature of a control center accommodating control assemblies of different sizes and numbers within a standardized outer housing is achieved by standardizing the manner of installation of the individual control assembly cabinets. In some control centers the cabinets have been provided with flanges at their front peripheries, and these flanges are bolted to the front framework of the bays comprising the control center. U.S. Pat. Nos. 2,319,415 and 2,645,743 are examples of such construction. No interior supports for the cabinets are required, but installation and removal of heavy assemblies is difficult in this type of construction. In some control centers, cabinets are supported by pins that fit in brackets, and a cabinet is swung into housed position after matching the pins into the associated brackets. U.S. Pat. Nos. 2,997,629; 3,278,698 and 3,321,672 are in this category. Correctly matching or locating the pins and brackets can be a cumbersome procedure, and also the amount of support for heavy cabinets is dependent upon a standard bracket size, which at times may be inadequate. A third manner of mounting control assembly cabinets is to provide a shelf upon which the cabinet is slid. U.S. Pat. Nos. 3,170,092; 3,346,776 and 3,469,149 are in this category. The present invention also provides shelves for cabinets that are slid into and out of housed position, and the invention provides improved constructions in this category.

SUMMARY OF THE INVENTION

The present invention relates to control centers and more particularly resides in a control center bay having removable shelves that may be installed at desired levels, and control assembly cabinets that are disposed on the shelves and secured in place. Each cabinet also has a configuration that cooperates with an adjacent wiring trough by providing space between the trough and cabinet to enable the cabinet to slide past wiring that extends out of the trough and that normally enters the cabinet when electrical connections are made.

An object of the invention is to provide a control assembly cabinet, for a control center that may be easily installed and removed.

Another object is to provide a means for readily securing a control center cabinet in place that is inserted into the center by a sliding motion over a shelf to which the cabinet becomes secured.

Another object of the invention is to provide for insertion and removal of a cabinet of a control center without obstruction from wiring that normally extends into the cabinet.

The foregoing and other objects and advantages of the invention will appear from the following description. In the description reference is made to the accompanying drawings which form a part hereof, and in which there is shown by way of illustration and not of limitation a preferred embodiment of the invention. Such embodiment does not represent the full scope of the invention, but rather the invention may be employed in a variety of embodiments, and reference is made to the claims herein for interpreting the breadth of the invention.

BRIEF DESCRIPTION OF THE DRAWINGS

FIG. 4 is a fragmentary view in section taken through the plane 4—4 indicated in FIG. 2 to depict the manner of installing the shelf forming a part of the invention, FIG. 5 is a fragmentary front view of a control assembly cabinet positioned upon a shelf that has been installed in the manner indicated in FIG. 4, FIG. 7 is a view in cross section of a cabinet installed in place which is taken through the plane 7—7 indicated in FIG. 5, FIG. 8 is a fragmentary view showing an electrical connection between a stab-type connector of a control assembly cabinet and a vertical feeder bus, which view is taken through the plane 8-8 indicated in FIG. 7, FIG. 9 is a fragmentary view in section of a lock for holding the cabinet in place which is taken through a portion of the plane 7—7 indicated in FIG. 5, FIG. 10 is a fragmentary view in cross-section of the locking mechanism of FIG. 9 showing a portion of such mechanism in another position.

DESCRIPTION OF THE PREFERRED EMBODIMENT

Figure 1:
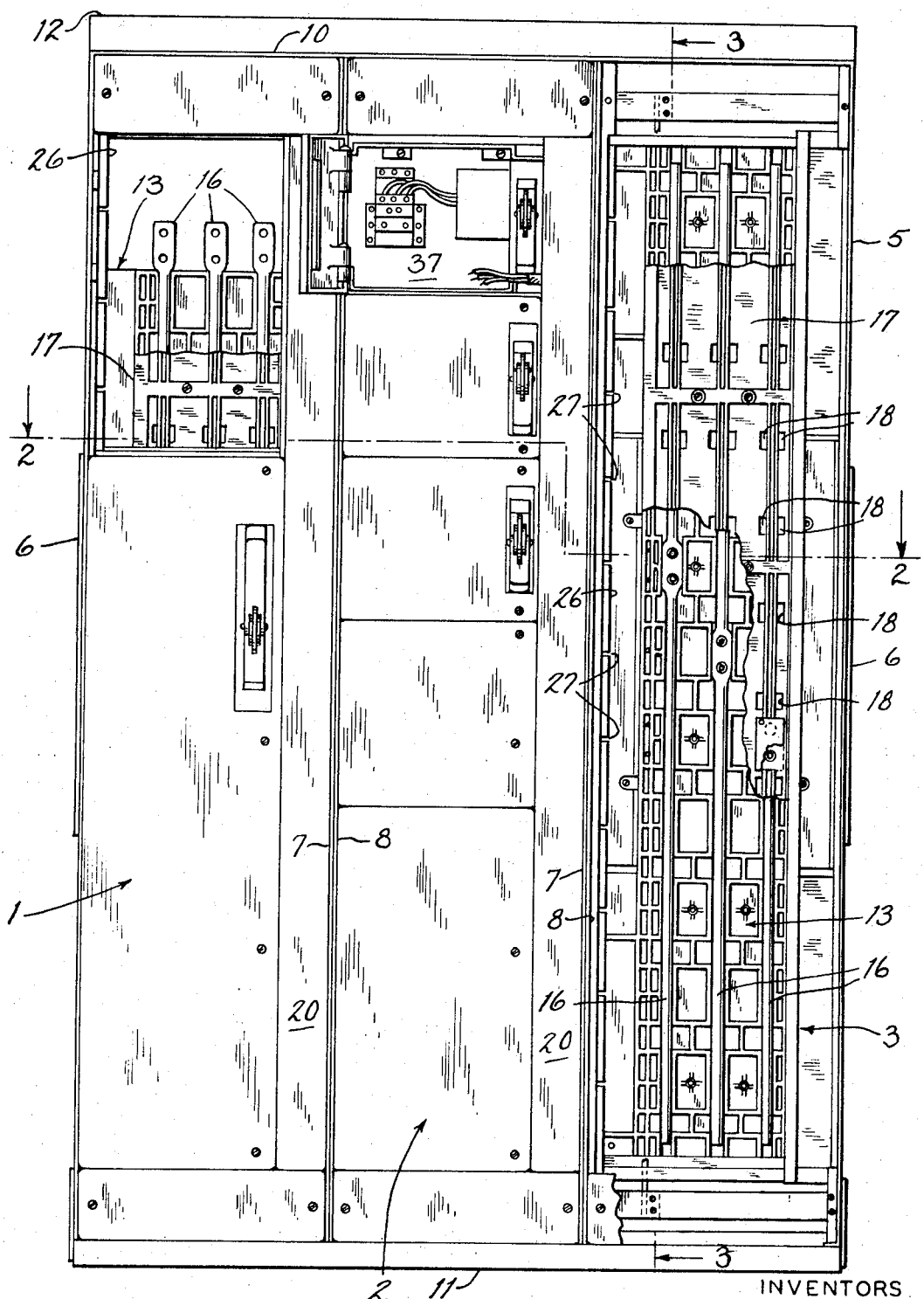
FIG. 1 is a front view of a control center consisting of three vertical bays, from which some of the parts have been removed and others have been broken away to reveal interior construction.
Figure 2:
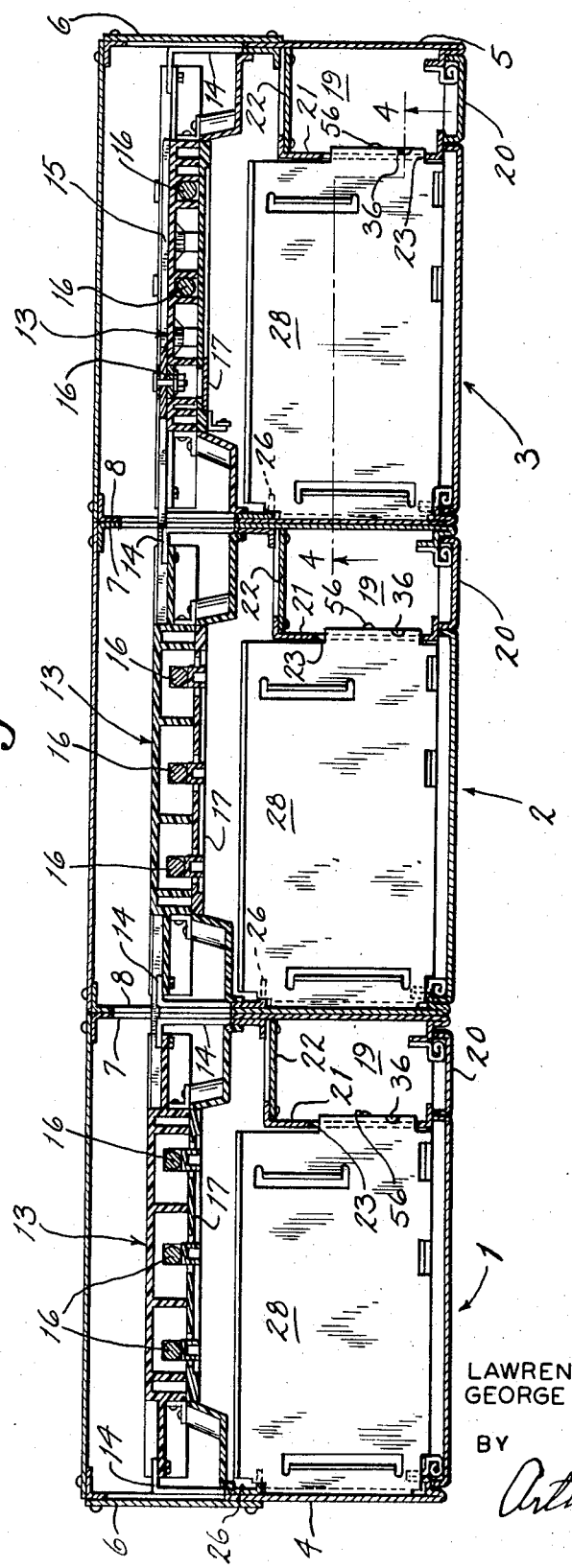
FIG. 2 is a plan view in section of the control center on a scale enlarged from that of FIG. 1, which is taken through the plane 2—2 indicated in FIG. 1.

Referring now to the drawings, the description will commence with the general arrangement of the control center. FIGS. 1 and 2 show that the control center is comprised of three vertical bays 1, 2 and 3. The bays 1 and 3 have outer end walls 4 and 5 that are mirror images of one another, except for mounting holes and slots formed therein. The end walls 4 and 5 include cover plates 6 which may be removed to gain access to the interior portion of the control center that houses power distributing bus bars. Bay 1 has an inner end wall 7 that abuts against an inner end wall 8 of the bay 2, and the walls 7 and 8 are mirror images of one another, except again for the location of holes and slots. Similarly, there is an inner end wall 7 at the right hand side of the bay 2 that abuts against an inner end wall 8 at the left hand side of the bay 3. As shown particularly in FIG. 3, each bay 1, 2 and 3 is provided with a rear wall 9 that completely encloses the back of the respective bay, and a top cover 10 that encloses the top of the bay. Running underneath the three bays 1, 2 and 3 is a support in the form of inverted channel members 11, and running across the top of the control center is an L-shaped angle bar 12.

The control center is provided with power distributing bus bars which will only be generally described herein, for the reason the construction and support of the bus bars is the subject of co-pending application Ser. No. 104,327 filed Jan. 6, 1971 and entitled "Electrical Control Center". These power distributing bus bars are supported in each bay 1, 2 and 3 by a molded insulating partition 13 which is set back from the front of the control center by approximately two-thirds the depth of the center. This insulating partition 13 is wall-like in character so as to compartmentalize each bay 1, 2 and 3, and, as particularly shown in FIG. 2, the partitions 13 are supported along their horizontal edges on brackets 14 which angle out from the end walls 6, 7 and 8. Each partition 13 is also of a honeycomb like configuration, as particularly illustrated in bay 3 of FIG. 1. Running across the back faces of the insulating partitions 13 is a set of three stiff, conductive, main power distributing buses 15, which are shown in cross section in FIG. 3, and which are disposed in a vertical plane one above the other. The center bus 15 is at a height corresponding with the mid-height of the control center, and one bus 15 is above and the third is below this center bus 15. Each bus 15 has a substantial height and a narrow width, and rests in a shallow, closely conforming channel formed in the rear of an insulating partition 13, so as to be supported and held from movement in three directions by the partition 13.

Mounted on the honeycombed, front face of each insulating partition 13 is a set of three vertical feeder buses 16, each of which is round in cross section and extends vertically for nearly the full height of the bay 1, 2 or 3 in which it is installed. Each feeder bus 16 is electrically connected to one of the main horizontal buses 15, and it is with these feeder buses 16 that control equipment assemblies to be hereinafter described make electrical connection for receiving electrical power fed to the control center. As shown in the right hand bay 3 of FIG. 1, the honeycombed front face of the insulating partition 13 is composed of a rectangular grid work to lend strength to the partition, and in FIG. 2 it is seen that this grid work forms troughs in which the feeder buses 16 are snugly disposed, so as to be retained in position. Over the honeycombed construction of each partition 13 there is secured a removable cover 17, the major portion of one cover 17 being broken away in the bay 3 of FIG. 1 to reveal the underlying honeycomb construction of the associated partition 13. The removable covers 17 are also shown in cross section in FIG. 2, and it is seen that the covers 17 constitute a shield that minimizes exposure of the feeder buses 16. The removable covers 17 have a series of regularly spaced, small rectangular openings 18, some of which are shown in the right hand bay 3 of FIG. 1, and one of which is shown on an enlarged scale in FIGS. 7 and 8. These openings 18 are provided so that electrical connections can be established with the feeder buses 16, in a manner hereinafter described.

At the front, and on right hand side, of each bay 1, 2 and 3 there is a vertical wiring trough 19, the location of which is best illustrated in FIG. 2. Each wiring trough 19 is defined at its right hand side by an end wall of the bay. In the case of bays 1 and 2 it is an end wall 7, and in the case of bay 3 it is the outer end wall 5. The front of each wiring trough 19 is defined by a hinged trough door 20 that is tall and narrow in appearance, and which extends from near the bottom of the respective bay to near the top of the bay. Each trough door 20 is hinged on its right side, and when it is swung open the interior of the wiring trough is fully exposed, so that wiring leading into and from the control assemblies mounted in the control center can be easily fed to and from such assemblies. The left hand side and rear of each wiring trough 19 is formed by an upright partition web 21 which, when viewed in horizontal cross section as in FIG. 2, is of L-shaped configuration. A medial portion of the rear of each partition web 21 has a removable cover 22 which provides access to that portion of the interior of the bay 1, 2 or 3 that lies behind the trough 19. Each partition web 21 is characterized by having a series of rectangular, vertically spaced openings 23 that range along the full height of the left hand side of the trough 19. Two of these openings 23 are visible in FIG. 3 through a break in bay end walls 7 and 8, which break is for the purpose of revealing a portion of the partition web 21 in bay 2. Openings 23 are also shown in section in FIGS. 2, 4 and 5. The openings 23 perform a dual purpose. First, they provide physical access to each wiring trough 19, so that wiring can be brought out of and led into the trough 19 for making connections with electrical control assemblies mounted in the control center. Second, the lower horizontal edge of each opening 23 provides a support for shelving that is placed within the bays 1, 2 and 3.

Figure 3:
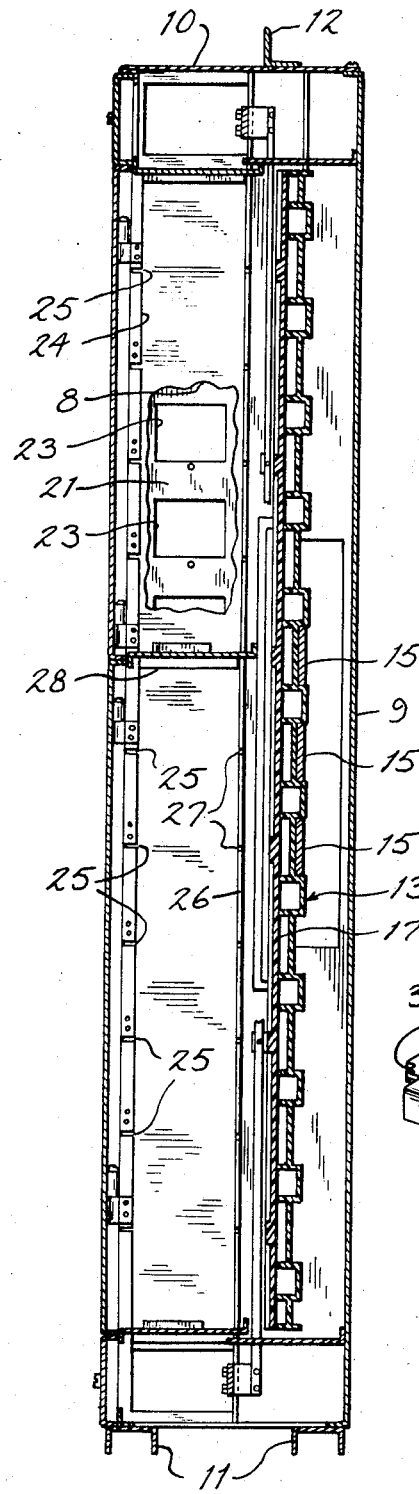
FIG. 3 is a view in vertical section of the control center taken through the plane 3—3 indicated in FIG. 1.

Referring now to the front edges of the bay end walls 4 and 8, it is seen in FIG. 2 that these edges are each formed with the sheet metal of the wall bent back upon itself, then sidewardly, and then again backwardly to present a flange 24. The flange 24 of the end wall 8 of bay 3 is shown in FIG. 3, and another flange 24 is shown on a larger scale in FIG. 7. Each flange 24 has a series of vertically spaced slots 25, that are most clearly shown in FIGS. 3 and 7. Each slot 25 is horizontal, cut in from the rear of its flange 24, and is at the same level as a corresponding bottom edge of an opening 23 in the partition web 21 that forms the vertical wiring trough 19 of the same bay.

Spaced to the rear of each flange 24 is a vertical flange 26 that is secured to the inside surface of the associated end walls 4, 8. Each vertical flange 26 has a series of vertically spaced notches 27, each of which is at the same height as a slot 25 in the flange 24 of the associated end wall 4, 8. The slots 25 and notches 27 function to support shelving now to be described.

Figure 6:
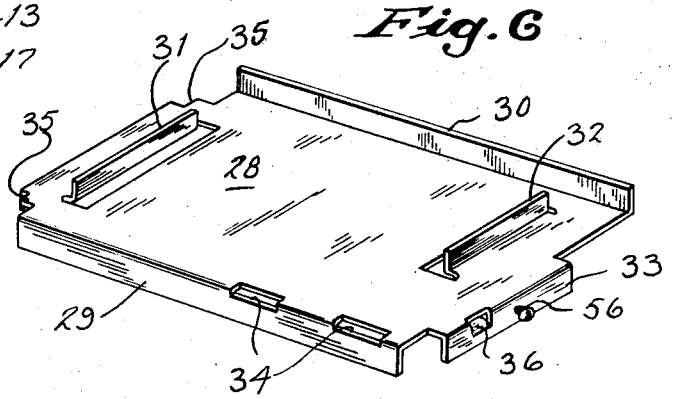
FIG. 6 is a view in perspective of a mounting shelf such as shown in FIG. 4.

A shelf 28 is shown in perspective in FIG. 6. The shelf 28 has a downwardly turned front edge 29, an upwardly turned rear stop 30, a pair of laterally spaced fore and aft extending guide flanges 31 and 32, and a downwardly turned lip 33 at its right hand margin. The shelf 28 is also provided with a pair of locking slots 34 at its forward edge, and a pair of sidewardly projecting mounting edges 35 that are a part of the left hand margin of the shelf. The manner of insertion of a shelf 28 into one of the bays 1, 2, 3 is illustrated in FIG. 4. The forward mounting edge 35 is inserted into one of the slots 25 in the rearwardly turned front flange 24 of the respective end wall 4 or 8, and the rearward mounting edge 35 is placed in one of the notches 27 of the associated vertical flange 26. This is done with the shelf 28 at an incline, as represented by the phantom lines in FIG. 4, and then the shelf is swung downwardly into the solid line position of FIG. 4. When this is done the downwardly pointing lip 33 at the right hand side of the shelf 28 enters one of the openings 23 in the partition web 21 forming the wiring trough 19, and catches with the bottom edge of such opening 23 to support the shelf. A small friction tab 36 in the downwardly turned lip 33 makes a tight fit, and a locking screw 56 in the lip 33 can be tightened. If desired, the screw 56 can take the alternative form of a spring clip that is pushed in place. In any event, the shelf 28 is now firmly in place, and it is installed at a level appropriate for receiving the particular control assembly cabinet that it is to support.

Figure 11:
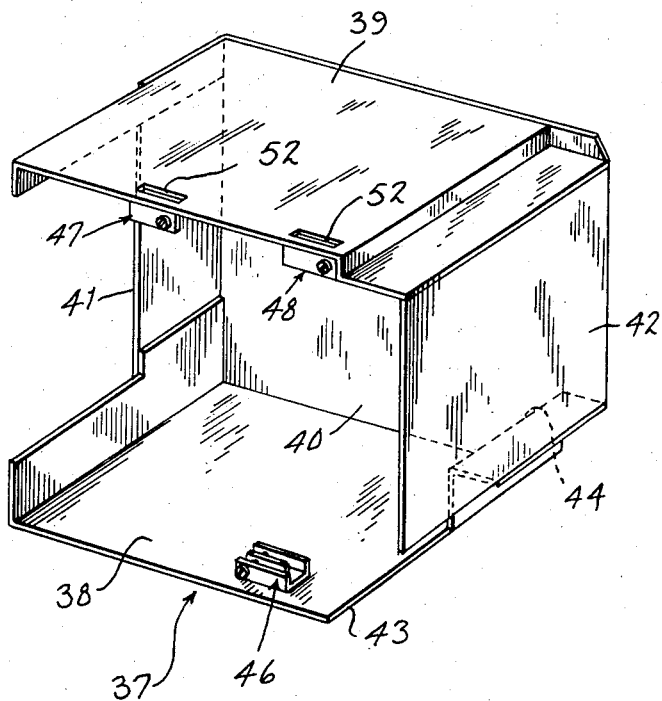
FIG. 11 is a view in perspective of a control assembly cabinet of the invention.

A representative cabinet 37 which houses an electrical control assembly is shown in FIG. 11. For purposes of clarity, the electrical apparatus which the cabinet 37 normally houses is not shown, for such apparatus does not play a part of the invention and comprises various electrical components such as are commonly employed in the individual control assemblies of a control center. The cabinet 37 has a floor 38, ceiling 39, rear wall 40, left hand side wall 41 which only partially encloses the left hand side for the reason only enough material is necessary to lend rigidity to the cabinet, and a right hand side wall 42. As more particularly shown in FIG. 5, the right hand side wall 42 does not extend completely downward to the level of the floor 38, but rather its lower terminus is at a level above the floor 38. Also, the floor 38 does not extend to the right hand extremity of the cabinet 37, but rather has its right hand edge terminating at a distance short of the right hand side wall 42. At the rear of the right hand edge 43 of the floor 38 there is a step 44, as shown in FIGS. 5 and 11, which joins the edge 43 with the lower edge of the right hand side wall 42. The presence of the step 44 leaves a recess, or set back in the side of the cabinet 37, as viewed in FIG. 5, which is identified by the numeral 45. When the cabinet 37 is inserted on a shelf 28, as again illustrated in FIG. 5, the recess 45 presents a space between the cabinet 37 and one of the openings 23 of the adjacent wiring trough 19. Also, at the front of the cabinet 37, where the step 44 is not present, the recess 45 opens upon the interior of the cabinet 37, to have a direct communication from within the cabinet 37, through the recess 45, and an opening 23 in the web 21 to the interior of the wiring trough 19.

Mounted on the floor 38 of the cabinet 37 is a channel shaped latch member 46, and secured on the underside of the ceiling 39 of the cabinet 37 is a pair of similar latch members 47, 48. The member 48 is shown on an enlarged scale in FIGS. 9 and 10, and the associated latch mechanism will be described with reference to these figures. An operating screw 49 extends between the webs of the latch member 48, and a latch tongue 50 in the form of a rectangular blade is mounted upon the operating screw 49 with a threaded engagement. A bias spring 51 encircling the screw 49 is inserted between the latch tongue 50 and one of the webs of the latch member 48 to hold the screw 49 and tongue 50 in place. The portion of the shank of the screw 49 immediately adjacent the head of the screw is square in cross section, and the end of the spring 51 which encircles this square portion is formed with a straight configuration that lies against one of the square surfaces. This causes the spring 51 to rotate with the screw 49, and the rotation of the spring 51 will urge the latch tongue 50 to also rotate in unison with the screw.

There is a slot 52 in the center web of the channel shaped member 48 which continues through the ceiling 39. The latch tongue 50 can be extended through the slot 52 by a turning of the screw 49. Turning motion of the tongue 50 is limited, in either direction, by a striking of the edge of the slot 52. Since the latch mechanisms of the members 46, 47 are like those of the member 48 like reference numerals have been applied to the parts thereof.

To mount the cabinet 37, it is slid onto its associated shelf 28 and the guide flanges 31 and 32 of the shelf restrict sidewise movement of the cabinet 37. The cabinet 37 is moved rearwardly until it strikes the rear stop 30 of the shelf 28, and hence the cabinet 37 is accurately located upon its insertion into one of bays 1, 2, 3 of the control center. With the cabinet 37 in place, the mechanisms of the latch members 46, 47 and 48 are now operated, and the manner of use of one of the latch mechanisms is illustrated in FIGS. 9 and 10. The operating screw 49 is turned to rotate the latch tongue 50 through the associated slot 52 into the position of the dotted lines in FIG. 9. This is a position in which the latch tongue 50 is directly behind the downwardly turned front edge 29 of a shelf 28 immediately above the cabinet 37 being locked in place, and the tongue 50 will remain in the vertical position for the reason it engages an edge of the associated slot 52 which restricts its turning movement. The operating screw 49 is now turned further to draw the latch tongue 50 forward into tight engagement with the front edge 29, as illustrated in FIG. 10. In similar fashion, the mechanism of the lower latch member 46 on the floor 38 of the cabinet 37 is operated to its locked position shown in FIG. 7.

In this instance, the latch tongue 50 is rotated downward through one of the locking slots 34 of the shelf 28 upon which the cabinet 37 rests, and the tongue 50 is then brought up tight against the back of the downwardly turned front edge 29 of the shelf. The cabinet 37 is now secured in position, and in this position stabdtype electrical connectors 53 protruding from the back of the cabinet 37 enter openings 18 in the cover 17 to make electrical contact with vertical feeder buses 16, as shown in FIGS. 7 and 8. Electrical power is thus introduced to the cabinet 37 for the assembly of electrical control apparatus which it houses. As stated before, this apparatus is not shown, for it is not part of the invention, except for the rendition of apparatus in the top of bay 2 of FIG. 1.

Wiring connected to the control apparatus within a cabinet 37 extends from within the cabinet into the adjacent vertical wiring trough 19, from where it runs to electrical apparatus outside the control center. Typical wiring of this nature is illustrated in FIG. 5, where a cord of individual, flexible leads 54 is shown terminating in a plug type connector 55. The leads 54 pass from the cabinet interior, through the recess 45, through the adjacent opening 23, and into the trough 19. Such wiring is usually readily disconnectable from the apparatus within the cabinet 37, as is illustrated in FIG. 5 by the connector 55.

When it is desired to install, or remove a cabinet 37, as for example the cabinet of FIG. 5, the flexible leads 54 and connector 55 are first laid, or bent, into the recess 45, so that they are wholly outside the cabinet 37. The cabinet 37 can then be slid easily past the wiring without obstruction.

Thus, the invention provides a set back between a cabinet 37 and an adjacent wiring trough 19 into which the ends of disconnected wiring can be laid to eliminate obstruction to cabinet movement. The invention facilitates the use of a control center by making cabinet movement a matter of ease.

We claim:

1. A bay for an electrical control center the combination comprising:
   a vertical wiring trough within the bay having a vertical web defining an inner side of the trough, such web having a plurality of openings each for passing flexible wiring from within the trough to the interior proper of the bay;
   a plurality of control assembly cabinets removably mounted within said bay, each being adjacent an opening in said wiring trough;
   each cabinet having a side wall alongside said vertical web of said wiring trough that is less than the height of said cabinet and having a floor less than the width of the cabinet to define a set back between itself and said wiring trough, which set back extends along the full depth of the cabinet to have a space between the cabinet and wiring trough that is not intersected by the cabinet as the cabinet is mounted and removed from the bay, and said set back having an opening between the interior of the cabinet and the region between the cabinet and wiring trough defined by the set back, such that flexible wiring for the cabinet normally extending from said wiring trough through said set back of the cabinet and into the cabinet may be deflected into the set back, whereby insertion and removal of a cabinet is made without interference with the wiring.

2. An apparatus as in claim 1 having: a shelf for each cabinet and locking means associated with each cabinet and shelf to secure the cabinet in position.

3. A bay for an electrical control center the combination comprising:
   a vertical wiring trough extending along the front and at one side of the interior of the bay, such trough being partially defined by a vertical web pierced by a column of vertically spaced openings, which openings present wiring access from the trough into the interior proper of the bay;
   shelf supports rising vertically along the interior side of the bay that are opposite said vertical web;
   a plurality of removable, horizontal shelves in said bay each supported at one end by said shelf supports and at the other end by insertion into one of said vertically spaced openings of said vertical web;
   a plurality of control assembly cabinets each slidable upon a shelf to a housed position within the bay; and
   each cabinet having a side wall alongside said vertical web of said vertical wiring trough that extends for a part only of the height of said cabinet to define a set back along its side adjacent said vertical wiring trough which extends along the full depth of the cabinet to have a space between the cabinet and wiring trough that is not intersected by the cabinet when the cabinet is mounted and removed from the bay, the set back of the cabinet having an opening which communicates with an opening in said vertical web, and which also opens upon the interior of the cabinet to thereby provide a space between the opening and the cabinet into which wiring that normally extends into the cabinet can be diverted, so when the cabinet is slid into and out of the bay wiring is bypassed by the cabinet.

4. An apparatus as in claim 3, wherein each shelf has a rear stop and a forward turned edge; and each cabinet has a latch member at its forward end that engages with said shelf edge.

5. A bay for an electrical control center the combination comprising:
   power distributing buses within the bay that are set back from the front of the bay;
   a vertically extending web within and at the front of said bay which defines a vertical wiring trough disposed along the front and one side of the interior of the bay, said web having a plurality of vertically spaced openings along its length which provide access from the trough into the interior proper of the bay;
   a trough door at the front of the bay enclosing said vertical wiring trough along the front thereof, and exposing the trough along its length when opened;
   shelf supports rising vertically along the interior of the side of the bay that are opposite said vertically extending web;
   a plurality of removable, horizontal shelves in said bay each supported between said shelf supports and said vertical web, each shelf having a downturned front edge with at least one slot adjacent the edge, a rear stop, and fore and aft extending cabinet guides;
   a plurality of control assembly cabinets each slidable upon a shelf to a housed position within said bay, the movement of a cabinet into housed position being guided by said cabinet guides of its associated shelf and limited by the rear shelf stop, each cabinet having:

lower and upper latch tongues pivotally mounted at the front of the cabinet for swinging movement in a vertical plane, which tongues of a cabinet being pivotable downward into a slot in the shelf upon which the cabinet rests and upward behind a turned edge of a shelf above the cabinet;

screw means in threaded engagement with said latch tongues for moving the latch tongues fore and aft to tighten the tongues against shelf surfaces, and to move the cabinet against the associated rear shelf stop;

stab-type connectors at the back of the cabinet connectable with said power distributing buses; and a set back along its side adjacent said vertical wiring trough, so when the cabinet is slid into and out of the bay the region of the set back is not intersected by the cabinet; and a plurality of cabinet doors at the front of the bay that expose the cabinets when opened.

6. A bay for an electrical control center the combination comprising:

a vertical wiring trough disposed along the front and at one side of the interior of the bay, such trough being partially defined by a vertical web having a plurality of vertically spaced openings which present wiring access from the trough into the interior proper of the bay;

shelf supports spaced vertically along the interior of the bay at a distance from said vertical wiring trough;

a plurality of removable, horizontal shelves in said bay each supported between said shelf supports and an opening in said vertical web, each shelf having a downturned front edge and a rear stop;

a plurality of control assembly cabinets each slidable upon one of said shelves to a housed position within the bay, the movement of a cabinet being limited by the rear stop of the associated shelf upon which it rests; and each cabinet having lower and upper latch members turnable into engagement with the edges of the shelves above and below the cabinet to secure the cabinet in place, each latch member having a channel shaped bracket; an adjustment screw in said bracket, a latch tongue threaded on said screw for movement along the screw, and a bias spring working against said latch tongue.

* * * * *